US006944155B2

(12) United States Patent
Block et al.

(10) Patent No.: US 6,944,155 B2
(45) Date of Patent: Sep. 13, 2005

(54) APPARATUS FOR FILTERING INTER-NODE COMMUNICATION IN A DATA PROCESSING SYSTEM

(75) Inventors: Timothy Roy Block, Rochester, MN (US); Richard Charles Booth, Rochester, MN (US); David Robert Engebretsen, Cannon Falls, MN (US); Thomas Rembert Sand, Rochester, MN (US); Kenneth Micheal Valk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 09/800,398

(22) Filed: Mar. 5, 2001

(65) Prior Publication Data

US 2002/0124105 A1 Sep. 5, 2002

(51) Int. Cl.[7] .............................................. H04L 12/28
(52) U.S. Cl. ........................ 370/389; 709/238; 709/223
(58) Field of Search .......................... 709/238; 370/389, 370/392

(56) References Cited

U.S. PATENT DOCUMENTS 6,272,133 B1 * 8/2001 Bialkowski et al. ........ 370/389
6,694,361 B1 * 2/2004 Shah et al. .................. 709/222
6,718,379 B1 * 4/2004 Krishna et al. ............. 709/223
2002/0051448 A1 * 5/2002 Kalkunte et al. ........... 370/389
2002/0133620 A1 * 9/2002 Krause ....................... 709/238

* cited by examiner

Primary Examiner—Frank Duong
Assistant Examiner—Michael J. Moore
(74) Attorney, Agent, or Firm—Dillon & Yudell LLP

(57) ABSTRACT

A method and system for communication in a system area network (SAN) data processing system are described. The SAN includes a plurality of interconnected nodes that each have at least one port for communication. To avoid communication-induced errors that may arise, for example, if multiple nodes share the same node ID, the port of a node in the SAN is marked as "fenced" to prevent transmission of packets of a first traffic type while permitting transmission of packets of a second traffic type. The marking of the port may be recorded, for example, in a configuration register of the port. While the port is fenced, only packets of other than the first traffic type are routed via the port. In one preferred embodiment, the second traffic type represents SAN configuration traffic, and the first traffic type represents non-configuration traffic. In this preferred embodiment, the marking of the port may be removed following communication of configuration traffic utilized to negotiate unique node ID throughout the SAN.

11 Claims, 4 Drawing Sheets

| Node ID | Port Number |
|---------|-------------|
| 5 | 0 |
| 4 | 1 |

| Node ID | Port Number |
|---------|-------------|
| 6 | 0 |
| 4 | 0 |
| — | 1 |

APPARATUS FOR FILTERING INTER-NODE COMMUNICATION IN A DATA PROCESSING SYSTEM

BACKGROUND OF THE INVENTION

1. Technical Field

The present invention relates in general to networks and, in particular, to a method and system for routing communication between nodes of a network containing multiple nodes. Still more particularly, the present invention relates to a network in which communication between nodes of a system area network (SAN) is filtered by traffic type, for example, to avoid errors arising from multiple nodes sharing the same node identifier.

2. Description of the Related Art

A system area network (SAN) is a collection of interconnected processor and peripheral nodes that operate in concert as a data processing system. The SAN topology advantageously permits large data processing systems customized to the processing, storage and I/O requirements of particular installations to be readily constructed through the interconnection of desired numbers of processor and peripheral nodes via backplane connections or inter-cabinet cables.

To promote reliable, efficient communication, a SAN generally logically and physically isolates processor buses and input/output (I/O) buses in separate nodes. Communication between the processors and peripherals in a SAN must therefore be routed between nodes, for example, utilizing unique node identifiers (IDs) assigned by firmware at system startup.

The conventional method of routing communication in a SAN is subject to errors if, following system startup, two SANs are interconnected, for example, by an intercabinet cable. Errors arise because the node IDs assigned in each of the smaller SANs may not be unique throughout the combined system. As a result, communication in the combined system may be routed incorrectly, possibly causing data corruption and/or other undesirable errors.

The present invention therefore recognizes that it would be useful and desirable to provide an improved method and system of inter-node communication in a SAN in which all of the nodes may not have unique node IDs.

SUMMARY OF THE INVENTION

The present invention introduces an improved method and system for communication in a system area network (SAN) data processing system.

The SAN includes a plurality of interconnected nodes that each have at least one port for communication. To avoid communication-induced errors that may arise, for example, if multiple nodes share the same node ID, the port of a node in the SAN is marked as "fenced" to prevent transmission of packets of a first traffic type while permitting transmission of packets of a second traffic type. The marking of the port may be recorded, for example, in a control register for the port. While the port is fenced, only packets of other than the first traffic type are routed via the port. In one preferred embodiment, the second traffic type represents SAN configuration traffic, and the first traffic type represents non-configuration traffic. In this preferred embodiment, the marking of the port may be removed following communication of configuration traffic utilized to negotiate unique node ID throughout the SAN.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

Figure 1:
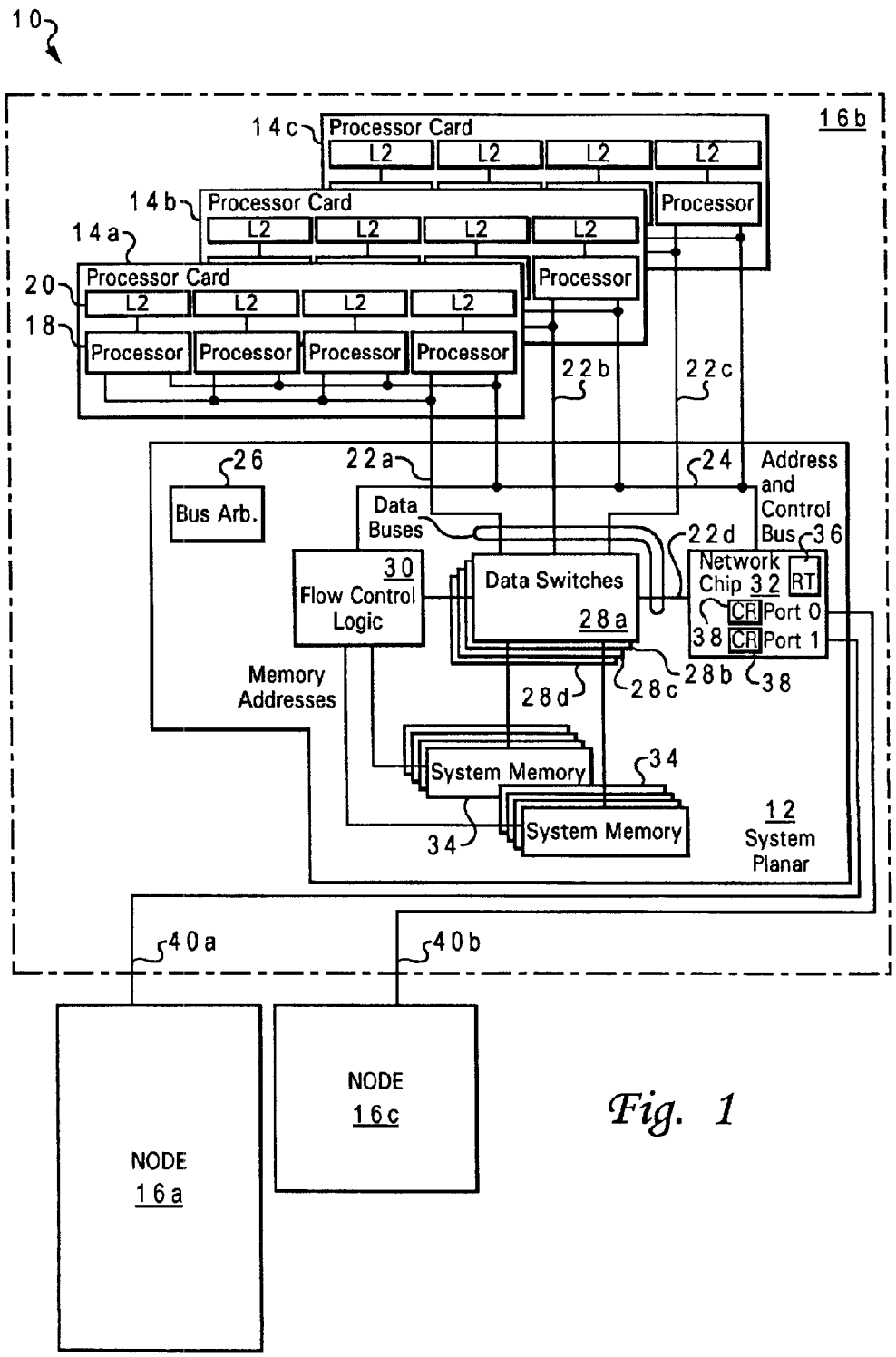
FIG. 1 depicts an illustrative embodiment of a SAN data processing system with which the present invention may advantageously be utilized.

With reference now to the figures and in particular with reference to FIG. 1, there is depicted a block diagram of an illustrative embodiment of a SAN data processing system 10 with which the present invention may advantageously be utilized. SAN 10 includes three nodes 16a–16c, which may each comprise a processor node containing one or more processors, or a peripheral node containing peripheral devices such as network adapters, nonvolatile data storage devices and adapters, I/O adapters, etc. As illustrated, nodes 16a–16c are coupled together for communication by interconnects 40a and 40b.

In an exemplary embodiment in which nodes 16a–16c physically reside in different drawers of a cabinet or in different cabinets, interconnects 40a and 40b may be implemented as cables containing a number of pairs of unidirectional wires that conduct differential signals in each direction.

In the depicted embodiment, node 16b is a processor node containing a system planar 12 coupled to one or more processor cards (in this case processor cards 14a–14c). Each processor card 14 carries four general purpose processors 18 that each have an on-chip level one (L1) cache (not illustrated) and an associated level two (L2) cache 20 that provide low latency storage for instructions and data. The processors 18 on each processor card 14 are all connected to address and control bus 24 and to an associated one of data buses 22a–22c.

System planar 12 includes a bus arbiter 26 that regulates access to address and control bus 24 by processors 18, as well as flow control logic 30 and network chip 32, which are each connected to address and control bus 24. Flow control logic 30 is further connected to dual-ported system memory 34 and data switches 28a–28d. Network chip 32 is further connected to data switches 28 by data bus 22d and to each of nodes 16a and 16c by a respective one of interconnects 40a and 40b.

Figures 3A, 3B, 5:
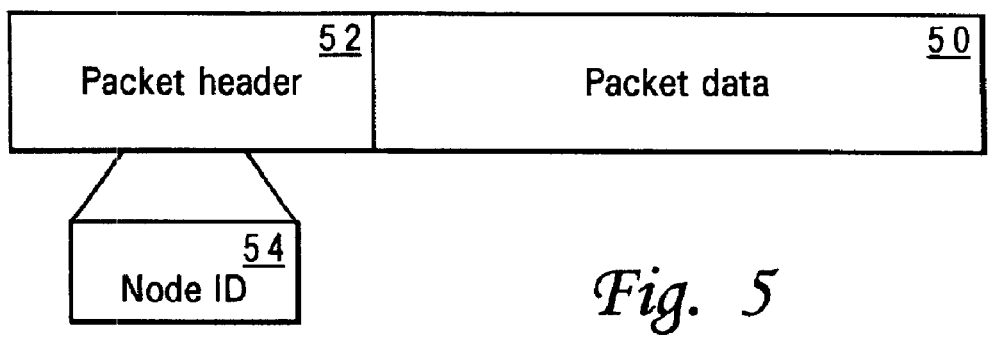
FIGS. 3A and 3B illustrate exemplary routing tables utilized to route packets between nodes in accordance with a preferred embodiment.
FIG. 5 illustrates one embodiment of a packet, which specifies a traffic type in a node ID field of a packet header.

Address transactions issued on address and control bus 24 are received by both flow control logic 30 and network chip 32. If an address transaction specifies an address assigned to system memory 34 in node 16b, flow control logic 30 forwards the specified address to system memory 34 as a memory access request. Flow control logic 30 also supplies control signals to data switches 28 to control the flow of data packets between processor cards 14, system memory 34, and network chip 32. Address and data transactions specifying addresses that are not assigned to system memory 34 are handled by network chip 32, which builds packets for the transactions and routes the packets toward the appropriate destination node(s) 16 by reference to a routing table 36. As shown in FIG. 5, each packet generally contains packet data (or payload) 50 and a packet header 52 including a node ID field 54 that identifies the node ID of a recipient node.

Figure 2A:
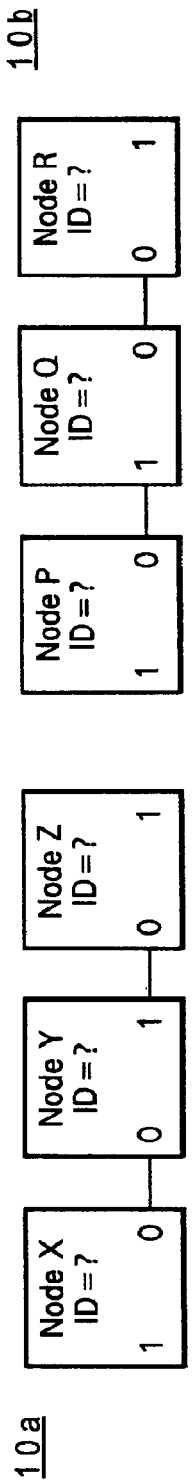
FIGS. 2A–2E together depict an exemplary communication scenario in which port fencing in accordance with the present invention is utilized to filter inter-node communication according to traffic type.

Referring now to FIGS. 2A–2E, there is depicted a communication scenario in which inter-node communication in a SAN is filtered utilizing port fencing in accordance with a preferred embodiment of the present invention. As shown in FIG. 2A, in the exemplary communication scenario, two SANs 10a and 10b are provided, which may each be constructed as described above with respect to FIG. 1. Each of nodes X, Y and Z of SAN 10a and nodes P, Q and R of SAN 10b contains a network chip 32 having at least two ports (i.e., ports 0 and 1) that can be connected to another node. As shown in FIG. 1, each port has an associated configuration register. In SAN 10a, port 0 of node X is connected to port 0 of node Y, port 1 of node Y is connected to port 0 of node Z, and port 1 of each of nodes X and Z is unconnected. Similarly, in SAN 10b, port 0 of node P is connected to port 1 of Node Q, port 0 of node Q is connected to port 0 of node R, and port 1 of each of nodes P and R is unconnected. When powered down as shown in FIG. 2A, none of the nodes has a system-assigned node identifier (ID).

Figure 2B:
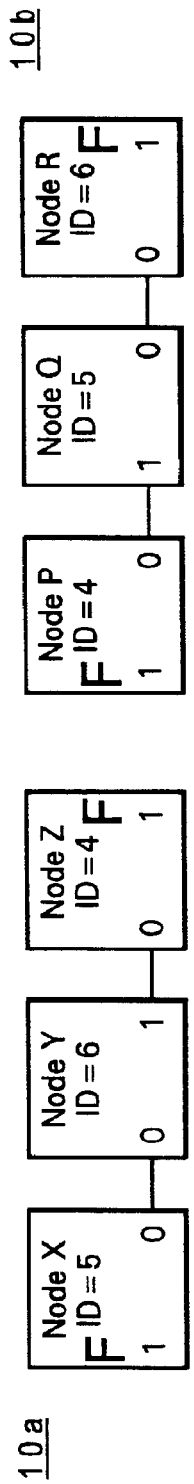

With reference now to FIG. 2B, following power on, firmware (e.g., stored within a non-volatile storage device, such as a read-only memory (ROM)) in each of SANs 10a and 10b independently initializes its SAN. As a part of the initialization process, the firmware in each of SANs 10a and 10b discovers the configuration of the SAN (i.e., which nodes are present in the SAN and the interconnections between the nodes) and assigns or negotiates a unique node ID by which each node will be identified in inter-node communication. The node IDs are stored in association with the associated port numbers in the routing table 36 of each node in the SAN. For example, FIG. 3A illustrates an exemplary routing table 36 for node Y of SAN 10a, which associates node ID 5 (i.e., the ID of node X) with port 0 and associates node ID 4 (i.e., the ID of node Z) with port 1. As illustrated in FIG. 3B, routing table 36 of node X in SAN 10a similarly associates node IDs 4 and 6 (i.e., the ID of nodes Y and Z) with port 0 and does not associate any node ID with port 1 because it is unconnected.

Because only a limited number of node IDs are available, it is possible, particularly in large SANs, for a node in SAN 10a to be assigned the same node ID as a node in SAN 10b. For example, as shown in FIG. 2B, node IDs 4, 5 and 6 are assigned to nodes in both of SANs 10a and 10b. To prevent errors from arising in the event that SANs sharing at least one common node ID are connected, the unconnected ports of SAN nodes are by default "fenced," which, as discussed further below, means that traffic directed to such ports is filtered based upon traffic type to exclude certain traffic types and permit at least one other traffic type. In a preferred embodiment, the fenced state of unconnected ports, if any, is recorded in configuration registers 38. As shown in FIG. 2B, port 1 of each of nodes X, Z, P and R are all marked as "fenced" (as represented by an "F").

Figure 2C:
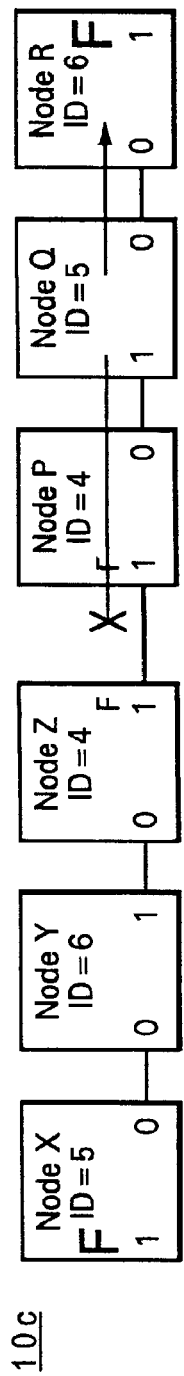
Figure 2D:
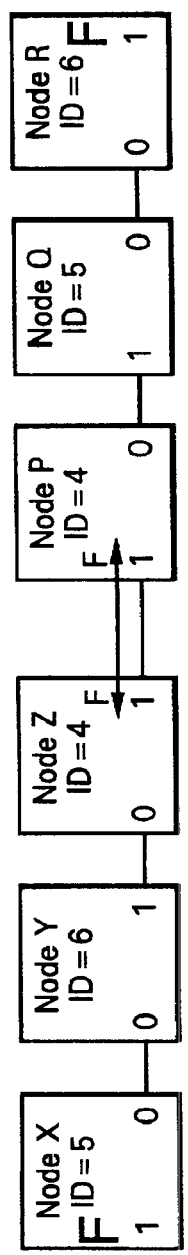
Figure 2E:
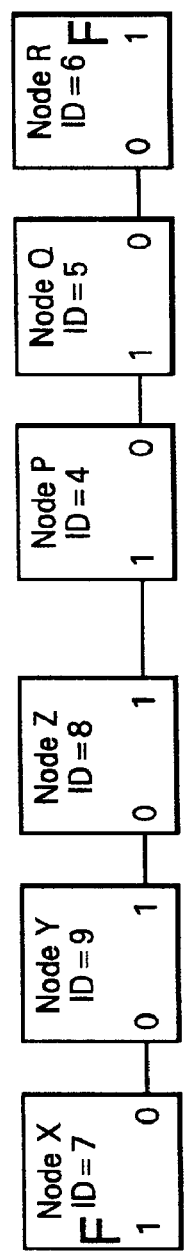
Figure 4:
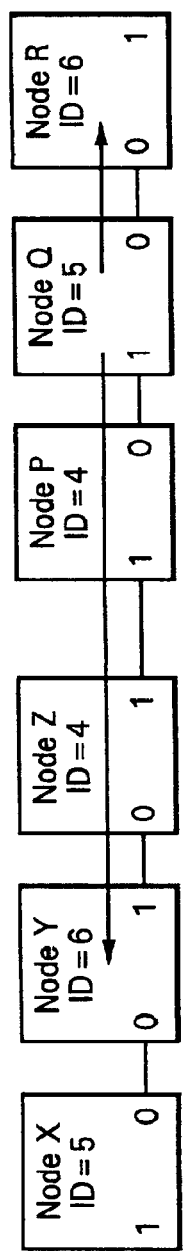
FIG. 4 depicts a communication scenario in which errors may arise in the absence of port fencing.

The importance of port fencing in accordance with the present invention can be seen by comparing FIGS. 2C–2E with FIG. 4. In both communication scenarios, a larger SAN 10c is formed by connecting port 1 of node Z in SAN 10a to port 1 of node P after independent power-on and initialization of SANs 10a and 10b. It is also assumed that node Q normally sends packets of the format illustrated in FIG. 5 to node R via its port 0.

As shown in FIG. 4, without port fencing, if node Q detects an error in sending packets to node R via port 0, node Q may redirect the packets to port 1 in attempt to reach node R via an alternative route. Upon receipt at node Z, the network chip 32 of node Z will route the packets to node Y based upon the node ID 6 specified in the packets' node ID field 54. Because node Y is not the intended recipient of the packets, processing of the packets by node Y may result in data corruption, system failure, and/or other undesirable errors.

FIGS. 2C–2E illustrate how such errors can be avoided by port fencing. As described above, following startup and initialization of SANs 10a and 10b, port 1 of each of nodes X, Z, P and R is fenced by appropriate settings in the configuration registers 38 of these nodes. As shown in FIG. 2C, if SANs 10a and 10b are subsequently joined to form SAN 10c by connecting port 1 of node Z and port 1 of node P with a cable, the fencing of port 1 of node P prevents certain (e.g., non-configuration) traffic from being routed to node Y. In a preferred embodiment, network chip 32 implements fencing by comparing the node ID field 54 in a packet with a predetermined value or values (e.g., 0xFFFF) utilized to identify permitted (e.g., SAN configuration) traffic. If network chip 32 determines that the value of node ID field 54 does not match the predetermined value, network chip 32 does not permit the packet to be routed via a fenced port. Accordingly, if node Q experiences errors in sending packets to node R and attempts to send the packets via an alternative route, for example, through node P, network chip 32 of node P will drop the packets rather than routing them to node Y via port 1, thus avoiding errors that may result from multiple nodes in SAN 10c sharing the same node ID.

Although port fencing prevents the transmission of certain (e.g., non-configuration) packets, port fencing in accordance with the present invention does not present a barrier to selected traffic types, such as SAN configuration traffic. For example, as shown in FIG. 2D, following the interconnection of SANs 10a and 10b to form SAN 10c, network chips 32 in nodes Z and P permit configuration packets, which are designated by a value of 0xFFFF in node ID field 54, to flow between port 1 of node Z and port 1 of node P. Such configuration traffic may be utilized, for example, by SAN operating system software to negotiate unique node IDs across SAN 10c. As shown in FIG. 2E, once unique node IDs have been negotiated, the configuration traffic may direct network chips 32 to remove the fencing of port 1 of each of nodes Z and P by updating the associated configuration registers. As a result, packets of all traffic types may freely flow between nodes Z and P without generating errors.

As has been described, the present invention provides an improved method and system for filtering communication between nodes of a system area network (SAN). In accordance with the present invention, communication ports not connected to another node are, by default, "fenced" to prevent one or more traffic types (e.g., non-configuration traffic) from being routed through the ports. However, traffic of one or more selected traffic types (e.g., configuration traffic) can be routed through the fenced port.

While the invention has been particularly shown and described with reference to a preferred embodiment, it will be understood by those skilled in the art that various changes in form and detail may be made therein without departing from the spirit and scope of the invention. For example, although in a preferred embodiment, the traffic type of packets is identified by particular values of a node ID field of a packet header, those skilled in the art will appreciate that the traffic type can be indicated in other ways, such as by a dedicated traffic type field in a packet header or in a separate data structure associated with a packet or packet flow.

Moreover, although aspects of the present invention have been described with respect to a computer system executing software that directs the functions of the present invention, it should be understood that present invention may alternatively be implemented as a program product for use with a data processing system. Programs defining the functions of the present invention can be delivered to a data processing system via a variety of signal-bearing media, which include, without limitation, non-rewritable storage media (e.g., CD-ROM), rewritable storage media (e.g., a floppy diskette or hard disk drive), and communication media, such as digital and analog networks. It should be understood, therefore, that such signal-bearing media, when carrying or encoding computer readable instructions that direct the functions of the present invention, represent alternative embodiments of the present invention.

What is claimed is:

1. A network chip for a node in a system area network including a plurality of nodes, said network chip comprising:
   a port for inter-node communication;
   means for marking the port to prevent transmission to another node of packets of a first traffic type while permitting transmission to another node of packets of a second traffic type, wherein said means for marking comprises means for marking said port by setting a port configuration register;
   a routing table that associates said port with a node identifier of at least one of said plurality of nodes: and
   means for, if said port is marked, routing via said port only packets not of said first traffic type, wherein said means for routing routes packets by reference to said routing table.

2. The network of claim 1, wherein said network chip comprises means for determining a traffic type of a packet by reference to a packet header of the packet.

3. A network chip for a node in a system area network including a plurality of nodes, said network chip comprising:
   a port for inter-node communication;
   means for marking the port to prevent ant transmission to another node of packets of a first traffic type while permitting transmission to another node of packets of a second traffic type, wherein said first traffic type comprises non-configuration traffic and said second traffic type comprises configuration traffic;
   means for, if said port is marked, routing via said port only packets not of said first traffic type; and
   means for, following transmission of packets of configuration traffic, removing said marking of said port.

4. The network chip of claim 3, and further comprising means, responsive to transmission of said packets of configuration traffic, for altering a node identifier used in packet routing.

5. A network chip for a node in a system area network including a plurality of nodes, said network chip comprising:
   a port for inter-node communication;
   means for marking the port to prevent transmission to another node of packets of a first traffic type while transmission to another node of packets of a second traffic type, wherein said means for marking comprises means for automatically marking said port if said port is unconnected at initialization of the system area network; and
   means for, if said port is marked, routing via said port only packets not of said first traffic type.

6. A node for a system area network including a plurality of nodes, said node comprising:
   a processor;
   a memory coupled to said processor; and
   a network chip in accordance with claim 1 coupled to said processor.

7. A system area network, comprising:
   a plurality of nodes; and
   a network coupling said plurality of nodes for complication;
   wherein a node among said plurality of nodes includes a network chip in accordance with claim 1.

8. A node for a system area network including a plurality of nodes, said node comprising:
   a processor,
   a memory coupled to said processor, and
   a network chip in accordance with claim 3 coupled to said processor.

9. A system area network, comprising:
   a plurality of nodes; and
   a network coupling said plurality of nodes for communication;
   wherein a node among said plurality of nodes includes a network chip in accordance with claim 3.

10. A node for a system area network including a plurality of nodes, said node comprising:
    a processor;
    a memory coupled to said processor, and
    a network chip in accordance with claim 5 coupled to said processor.

11. A system area network, comprising:
    a plurality of nodes; and
    a network coupling said plurality of nodes for communication;
    wherein a node among said plurality of nodes includes a network chip in accordance with claim 5.

* * * * *